(12) United States Patent
Phillips et al.

(10) Patent No.: US 6,178,179 B1
(45) Date of Patent: Jan. 23, 2001

(54) SYSTEM AND METHOD FOR LINKING A VDSL BASED DISTRIBUTION SYSTEM WITH AN XDSL BASED SYSTEM

(75) Inventors: Bruce A. Phillips, Highlands Ranch; Kurt A. Campbell, Lafayette; Joseph P. Huggins, Highlands Ranch; Darwei Kung, Denver; John M. Czak, Aurora, all of CO (US)

(73) Assignee: Qwest Communications International Inc., Denver, CO (US)

( * ) Notice: Under 35 U.S.C. 154(b), the term of this patent shall be extended for 0 days.

(21) Appl. No.: 09/222,692

(22) Filed: Dec. 29, 1998

(51) Int. Cl.[7] .................. H01J 3/16; H01J 3/22
(52) U.S. Cl. ........................ 370/465; 370/467
(58) Field of Search .................. 370/465, 351, 370/352, 353, 354, 359, 420, 421, 422, 423, 424, 428, 437, 452, 460, 463, 466, 467; 375/219, 220, 221, 222, 295, 316; 379/27, 56.2, 87, 88.07, 88.13, 283

(56) References Cited

U.S. PATENT DOCUMENTS

| | | |
|---|---|---|
| 5,408,260 | 4/1995 | Arnon . |
| 5,534,912 | 7/1996 | Kostreski . |
| 5,627,501 | 5/1997 | Biran et al. . |
| 5,673,290 * | 9/1997 | Cioffi ..................................... 375/260 |
| 5,812,786 * | 9/1998 | Seazholtz et al. .................... 709/233 |
| 5,883,907 * | 3/1999 | Hoekstra .............................. 714/784 |
| 5,905,781 * | 5/1999 | McHale et al. .................. 379/93.14 |
| 5,949,763 * | 9/1999 | Lund .................................... 370/261 |
| 5,970,066 * | 10/1999 | Lowry et al. ........................ 370/353 |
| 5,987,061 * | 11/1999 | Chen .................................... 375/222 |
| 6,069,899 * | 5/2000 | Foley ................................... 370/494 |
| 6,092,122 * | 7/2000 | Liu et al. .............................. 375/233 |

* cited by examiner

*Primary Examiner*—Douglas W. Olms
*Assistant Examiner*—Phirin Sam
(74) *Attorney, Agent, or Firm*—Brooks & Kushman P.C.

(57) ABSTRACT

An xDSL signal distribution system is provided having a DSL translator unit located between a central office XTU unit and a customer location for allowing equipment of multiple types of DSL signal format to be used within the same distribution system. The translator unit is arranged to decode the payload of transmitted signals of one type of DSL format into base digital data. The translator unit then performs line code conversion to a second desired type of DSL code format. In addition, the translator unit employs buffering to allow transmission of the converted xDSL signals at a transmission rate suitable for the type of coding.

9 Claims, 1 Drawing Sheet

SYSTEM AND METHOD FOR LINKING A VDSL BASED DISTRIBUTION SYSTEM WITH AN XDSL BASED SYSTEM

TECHNICAL FIELD

The present invention relates to an arrangement for allowing distribution of digital video signals, and more specifically to linking of distribution networks using different types of digital subscriber line (DSL) type signals.

BACKGROUND ART

Generally, distribution of video signals has been carried out through coaxial cable networks used to link one or more video distribution sources with a plurality of subscribers. However, due to the high cost and minimal signal quality of such coaxial cable-based distribution networks, alternative approaches have been devised for distributing video signals. For example, telephone lines have been suggested as a physical structure for supporting distribution of video signals. However, systems using the public switched telephone network (PSTN) are often bandwidth limited, providing generally only still frame or video conferencing capabilities. In addition, because telephone system carriers only typically use the PSTN for connectivity between subscribers, the PSTN does not provide any capability for dynamic routing of digitized video without the use of dedicated leased, wide bandwidth circuits. Telephone line based systems also fail to provide acceptable VCR type functional control over the distribution of video programming.

On the other hand, an enhanced public switched telephone network does provide the capability of distributing video on demand to subscribers over the PSTN. In such an arrangement, a menu of video programming information is made accessible at a subscriber's premises. A subscriber may transmit ordering information via the PSTN to available independent video information providers. Video programming can then be accessed and transmitted to the subscriber directly from a video information provider or through a central office (CO) serving the subscriber. The video information provider is typically arranged to transmit coded digital video data over wideband PSTN connected to the CO. The video data may be buffered at the central office for transmission over a plain old telephone service (POTS) line to the subscriber. Subscribers may use either a standard telephone or a dedicated control device located at a television set to order the video programming.

The central office is connected to the various subscribers for transmission of video data coded in a digital subscriber line (DSL) type format, such as very-high-data-rate digital subscriber line (VDSL) type coding, asymmetrical digital subscriber line (ADSL) coding, or rate adaptive digital subscriber line (RADSL) type coding. In such an arrangement, multiple DSL interface units are deployed to combine video information together with bidirectional signalling and POTS for transmission over an ordinary telephone wiring plant.

However, because each type of coding format has differences in advantages and disadvantages associated therewith, particularly with respect to data transfer rates and maximum permissible length of cable run, individual video distribution providers have designed independent distribution network architectures around the type of coding best suited to their respective needs. As a result, inter-system compatibility has thus far been compromised, thereby diminishing the advantages otherwise gained by using DSL signal formatting. Therefore, a need exists for a video and data signal distribution system which can operate using different types of DSL coding format.

DISCLOSURE OF INVENTION

Therefore, it is an object of the present invention to provide a system and method for distributing digitized video signals which overcomes the limitations on system compatibility found in prior arrangements.

In accordance with this and other objects, the present invention provides a method and system for distributing multiple type of digital subscriber line (xDSL) signals to end users over a telephone wiring plant, where a central office and an end user utilize different types of DSL signal format. A translator is located between the central office and the end user and includes a receiver for receiving xDSL signals transmitted on the twisted pair copper cable from either the central office or the end user, a line code translator for encoding the base data into the DSL format used by the destination device, and a line driver for transmitting the converted/encoded signal onto the twisted pair copper cable for distribution to the original destination.

In accordance with other features, the central office can transmit xDSL signals using an asynchronous transfer mode (ATM) protocol, and the translator encoder would be arranged to repackage the base data into the ATM protocol format depending on the protocol requirements of the destination terminal. In one embodiment, the xDSL format used by the central office is a very-high-data-rate digital subscriber line (VDSL) type signal format, and the DSL format used at the customer location is a rate adaptive digital subscriber line (RADSL) type signal format. In addition, buffering of the data is provided at the translator to accommodate any difference in transmission rate between the different types of DSL signal format.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
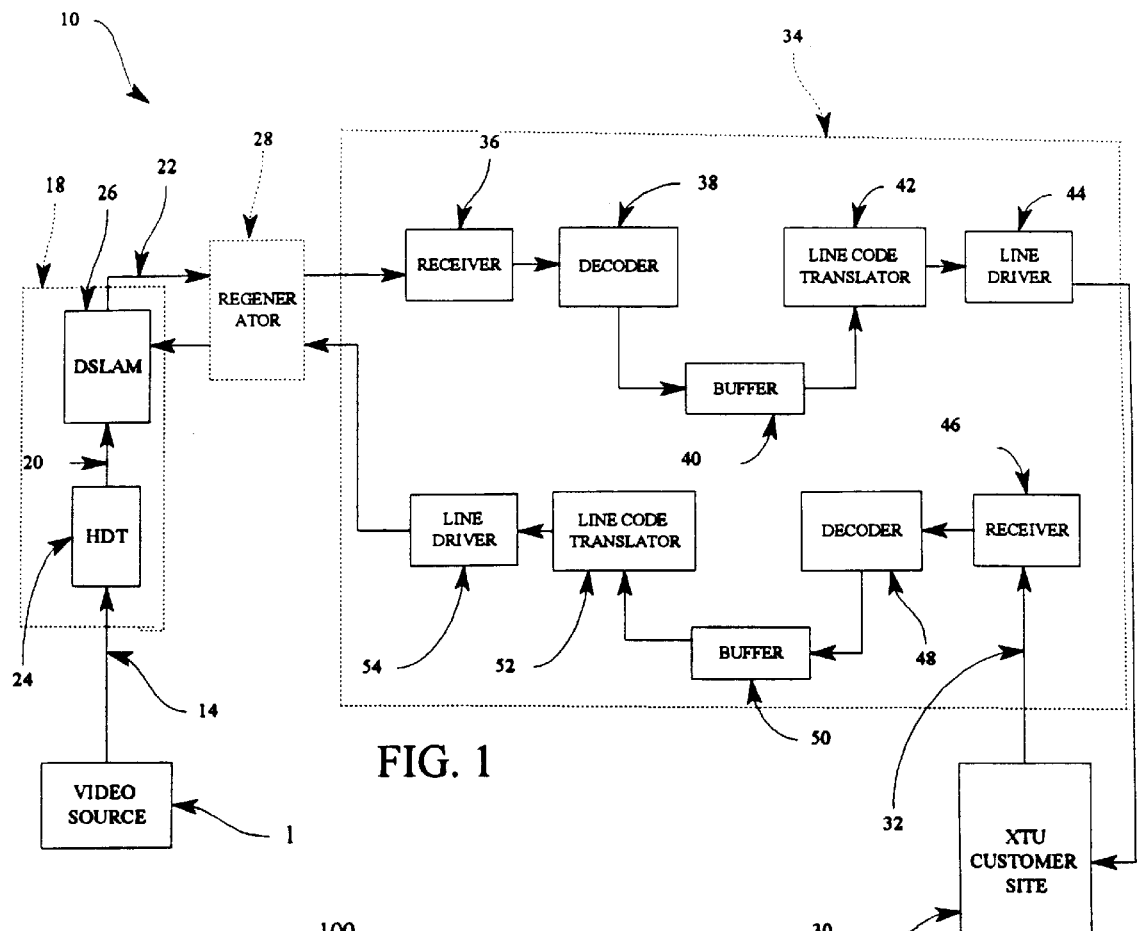
FIG. 1 is a block diagram of a xDSL distribution system incorporating a translator in accordance with the present invention.

Referring to FIG. 1, an xDSL signal distribution system 10 is shown in accordance with the present invention. It is noted for purposes of understanding the present invention, the term xDSL is used as a broad label for identifying a number of different types of digital subscriber line (DSL) signal formats, such as rate adaptive DSL (RADSL), ADSL, high-bit-rate DSL (HDSL), and very-high-data-rate DSL (VDSL). The present invention as described below can be suitably adapted to provide compatibility for two or more of these formats within the same distribution system.

As shown in FIG. 1, a video or data source 12 generates suitable video and data signals 14 for distribution to one or more customer sites. More specifically, the video signals are initially transmitted to a xDSL transmission unit ($XTU_{co}$) located at a central office location 18. The $XTUC_{co}$ then retransmits the signals on a distribution line formed from a fiber optic cable 20, and a twisted pair copper cable 22. The XTU$_{co}$ includes a suitable host digital terminal (HDT) 24 and a digital subscriber line access multiplexer (DSLAM) 26 for combining telephony and digital data signals with the video signals on the twisted pair copper cable 22 as analog signals.

The signals transmitted from XTU$_{co}$ 18 are preferably sent using an asynchronous transfer mode (ATM) based protocol with Internet protocol (IP) encapsulated data. Such a protocol requires ATM framing of the signals to include a timing signal used by a receiving unit decoder to decode the signal payload. A signal regenerator 28 can be located between the central office and customer locations to extend the distribution range of system 10. Regenerator 28 operates to decode signals traveling in either direction so that the signals can be retransmitted at original signal quality and strength.

The transmitted signals are ultimately received at one or more XTU$_{cust}$ terminals 30 located at the respective customer sites 16. The XTU$_{cust}$ terminals include suitable demultiplexers and decoders for separating the telephony, data, and video signals for output at suitable customer equipment such as a telephone, modem, and television. The XTU$_{cust}$ terminal further includes multiplexers and coding arrangements which allow signals to be transmitted back to XTU$_{co}$ 18. While the same twisted pair and fiber optic cables are used for transmission of signals in both directions, the return path has been separately shown in FIG. 1 as line 32.

In accordance with the present invention, inter-system or multiple code compatibility is achieved by positioning an xDSL translator unit 34 between the central office and the customer locations, which can be upstream or downstream of a regenerator (if employed), as a substitution for a regenerator, or at an inter-system junction. Positioning of translator unit 34 also must take into account signal degradation due to distance from the transmitting source. More specifically, positioning of a translator unit can be based on the effective loss of signal as a result of such factors as wire gauge, temperature, and distance, such that the translator unit will be located within a distance corresponding to a point where the calculated S/N ratio reaches a threshold of minimum acceptable signal quality. The translator is preferably located near the customer location. The ATM layer transported on the distribution line will be repackaged and retransmitted at the translator to insure the data payload is valid.

Translator unit 34 includes a receiver 36 for receiving signals from XTU$_{co}$ 18, a decoder 38 for analog-to-digital conversion and decoding of the IP encapsulated ATM payload of the received signals into base digital data, and a buffer 40 for temporarily storing the base data. Receiver 36 includes a suitable time generator for extracting the timing of the incoming signals when an ATM protocol is used. A line code translator 42 then reforms or repackages the data from buffer 40 into the necessary xDSL format, e.g., VDSL to RADSL or vice verse, and a line driver 44 retransmits the encoded signals onto the distribution line. A similarly arranged receiver 46, decoder 48, buffer 50, line code translator 52, and line driver 54 are provided for regenerating signals transmitted on line 32 from an XTU$_{cust}$ 30 to XTU$_{co}$ 18.

As an example of one mode of operation in accordance with the present invention, line code translator 42 is arranged to change the incoming line signals from quadrature amplitude modulated (QAM) signals to discrete multitone (DMT) or synchronous discrete multitone (SDMT), for subsequent recoding to carrier amplitude phase (CAP) modulated signals in order to convert VDSL layer signals to RADSL layer signals. Buffering of data is provided to handle the potential change in data rate from 13–52 Mbps (for VDSL) to 1–7 Mbps (for RADSL).

Figure 2:
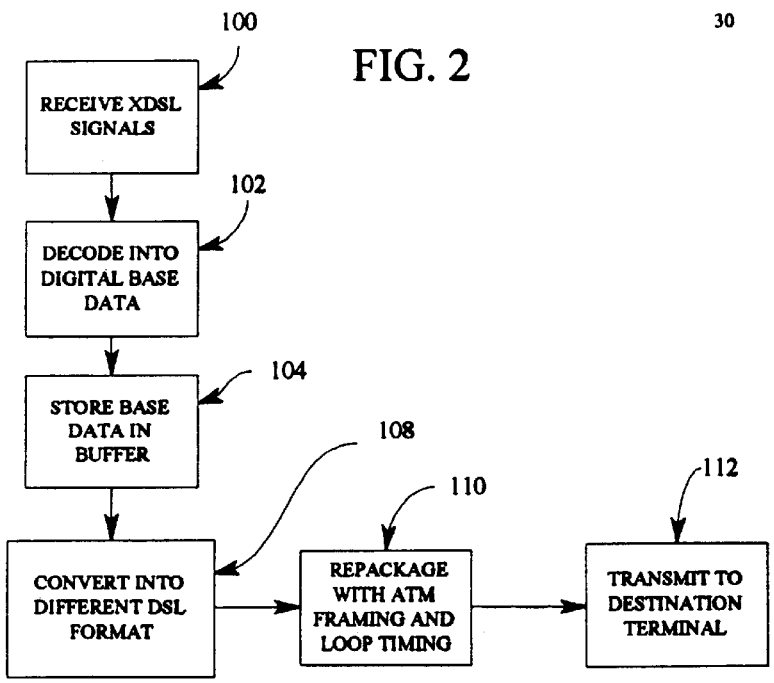
FIG. 2 is a flow chart illustrating overall system operation in accordance with the present invention.

Referring now to FIG. 2, a flowchart illustrates the overall operation of the translator unit 34. As denoted at block 100, signals of one xDSL format are received by receivers 36 or 46. The received signal payload is subsequently decoded into a base data level at block 102, and temporarily stored in the appropriate buffer at block 104. At block 106, appropriate line code conversion is made after retrieving the payload base data from the buffer, including reframing or repackaging of the data with the appropriate ATM framing and necessary loop timing at block 108.

As denoted at block 110, once the payload has been repackaged, the signal is transmitted on the distribution line using a suitable line driver. As noted above, the rate of transmission can be fixed or variable as part of a through-put optimization process.

Thus, the present invention provides a system and arrangement for distributing multiple type xDSL type signals on the same distribution network. While the best mode for carrying out the invention has been described in detail, those familiar with the art to which this invention relates will recognize various alternative designs and embodiments for practicing the invention as defined by the following claims.

What is claimed is:

1. A system for distributing multiple types of digital subscriber line (xDSL) signals to end users over a telephone wiring plant comprising:

a central office for receiving video signals from a video source, the central office including a transmission unit for transmitting the received video signals in a particular type of DSL format on a twisted pair copper cable along with other telephony and digital data signals, and a receiver for receiving data signals from end users;

at least one end user location having a transmission unit for receiving video signals from the twisted pair copper cable and transmitting data signals to the central office in a different type of DSL format from the DSL format used by the central office; and a translator connected to the twisted pair copper cable and located between the central office and the at least one end user location for translating xDSL signals between different DSL formats, the translator comprising:

a receiver for receiving xDSL signals transmitted on the twisted pair copper cable from either the central office or the end user;

a decoder for decoding the payload of a received xDSL signal into base data;

a line code translator for encoding the base data from the DSL format used by the transmitting device into the DSL format used by the destination device; and a line driver for transmitting the encoded signal onto the twisted pair copper cable for distribution to the receiving device.

2. The system of claim 1 wherein the central office transmits xDSL signal using an asynchronous transfer mode (ATM) protocol, and the translator is arranged to repackage the base data into the ATM protocol format.

3. The system of claim 1 wherein the DSL format used by the central office comprises a very-high-rate digital subscriber line (VDSL) type signal format.

4. The system of claim 3 wherein the DSL signal format used by the end user location comprises a rate adaptive digital subscriber line (RADSL) type signal format.

5. A method for distributing multiple types of digital subscriber line (xDSL) signals to end users over a telephone wiring plant comprising:

receiving video signals at a central office from a video source;

transmitting the received video signals on a twisted pair copper cable along with other telephony and digital data signals as a particular type of DSL formatted signal to a terminal located at an end user site, and receiving data signals on the twisted pair copper cable at the central office from an end user terminal, wherein the end user site receives and transmits signals in a DSL format different than the central office;

at a translator located between the central office and the end user site, receiving transmitted xDSL signals from either the central office or the end user site, and decoding the received xDSL signals into base data;

converting the signal format by encoding the base data from the DSL format used by the transmitting device into the DSL format used by the receiving device; and transmitting the converted DSL signal to the receiving device.

6. The method of claim 5 further comprising transmitting xDSL signals from the central office transmits using an asynchronous transfer mode (ATM) protocol, and repackaging the base data into the ATM protocol format.

7. The method of claim 5 further comprising transmitting the received video signals from the central office as very-high-rate digital subscriber line (VDSL) type signals.

8. The method of claim 7 further comprising encoding the base data derived from VDSL signals received at the translator in rate adaptive digital subscriber line (RADSL) type signals.

9. A translator for use in a digital subscriber line (XDSL) signal type signal distribution system for translating xDSL signals between different DSL formats, the distribution system including a central office for transmitting video signals on a twisted pair copper cable along with other telephony and digital data signals in one particular type of DSL signal format to at least one end user location which operates in a different type of DSL format, the translator comprising:

a receiver for receiving xDSL signals transmitted on the twisted pair copper cable from either the central office or the end user;

a decoder for decoding the payload of a received XDSL signal into base data;

a line code translator for encoding the base data from the DSL format used by the transmitting device into the DSL format used by the receiving device; and a line driver for transmitting the encoded signal onto the twisted pair copper cable for distribution to the receiving device.

* * * * *